A. C. SARGENT.
METHOD OF MAKING TOOTHED WIRE COVERED CYLINDERS.
APPLICATION FILED JULY 26, 1911.
1,016,098.
Patented Jan. 30, 1912.
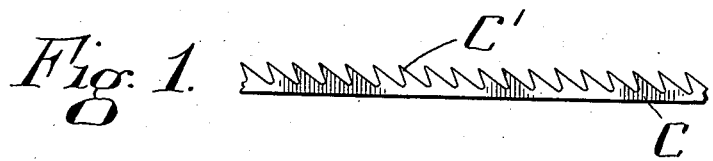
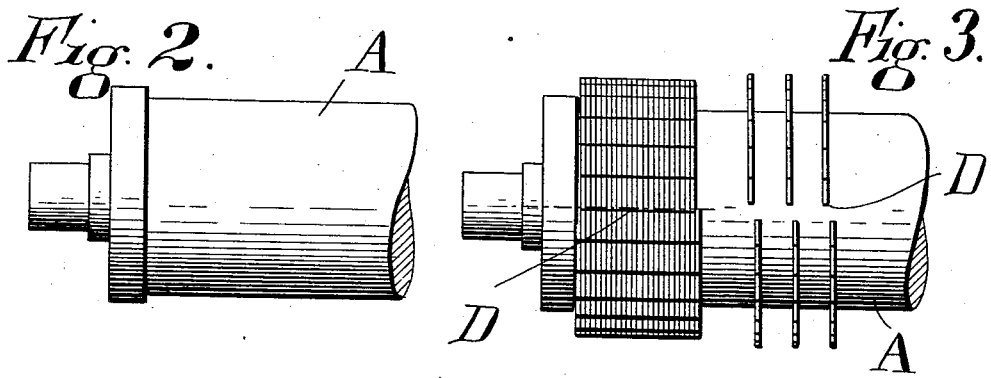
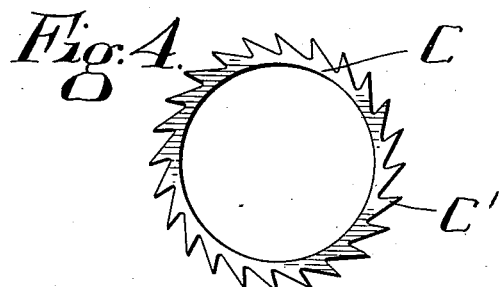
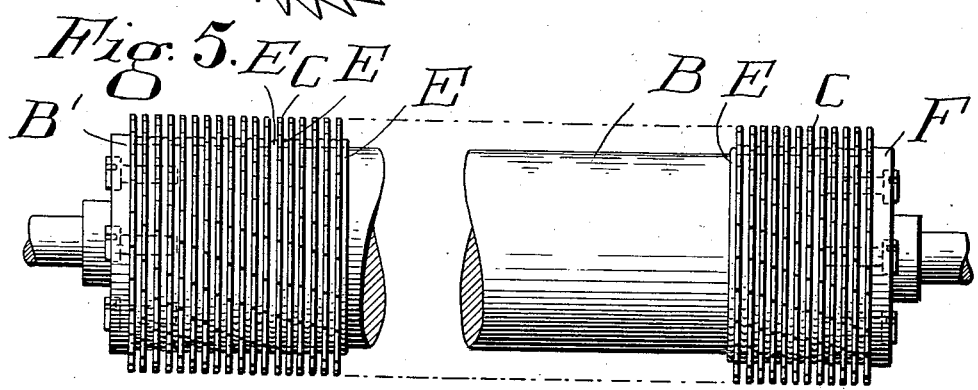
Witnesses.
E. M. Allen.
C. I. Hartnett
Inventor
Allan C. Sargent.
By Attorneys.
Southgate & Southgate.

UNITED STATES PATENT OFFICE.

ALLAN C. SARGENT, OF WESTFORD, MASSACHUSETTS, ASSIGNOR TO C. G. SARGENT'S SONS CORPORATION, OF GRANITEVILLE, MASSACHUSETTS, A CORPORATION OF MASSACHUSETTS.

METHOD OF MAKING TOOTHED-WIRE-COVERED CYLINDERS.

1,016,098.  Specification of Letters Patent.  Patented Jan. 30, 1912.

Application filed July 26, 1911. Serial No. 640,626.

*To all whom it may concern:*

Be it known that I, ALLAN C. SARGENT, a citizen of the United States, residing at Westford, in the county of Middlesex and State of Massachusetts, have invented a new and useful Method of Making Toothed-Wire-Covered Cylinders, of which the following is a specification.

This invention relates to the manufacture of metallic cylinders for many uses in the textile industries, having toothed surfaces formed by wire arranged on the surface thereof. Heretofore the practical way of manufacturing these cylinders has been to provide them with a helicoidal groove into which the inner edge of the toothed length of soft iron wire was wound. In this way the wire was held firmly in position but in case of any damage the entire length of wire had to be removed and replaced by a new one and the cost of manufacture was large. However, this method was adopted because it did not involve much waste of material and provided a firm seat for the convolutions of wire.

The objects of this invention are to provide for arranging the same kind of wire on the surface of such a cylinder without grooving the same, thus materially reducing the cost of manufacture and at the same time to provide this wire in short lengths so that in case of injury only a portion of the wire need be removed and replaced.

Reference is to be had to the accompanying drawings in which,

Figure 1 is a side view of a length of wire before it is placed on the cylinder. Fig. 2 is a side view of a cylinder used as a templet on which the wire is being wound. Fig. 3 shows the same cylinder with the wire all wound thereon and the several convolutions cut to constitute the next step of the process. Fig. 4 is an elevation of one of these convolutions removed and with its ends electric welded together to form a ring, and Fig. 5 is a side view of a complete cylinder showing how the rings are held in position thereon.

To begin at the first step of the method, a cylinder A is employed slightly smaller in diameter than the cylinder B on which the wire C is to be placed. This wire comes in long lengths with the teeth C' along one edge thereof. These teeth may be of various shapes according to the use to which the metallic cylinder is to be put, it being understood that these cylinders are used for a large number of purposes in textile works, as for example, breast rolls, feed rolls, burs, lickers-in, etc. Instead of winding a continuous length of this wire directly on the cylinder B itself in a helicoidal groove thereon, this helicoidal groove is dispensed with and the first step of the process consists in winding a continuous length of the wire on the smooth surface of the cylinder A. It is wound in a helicoidal manner so that each convolution is in contact with the one next to it. When this is done and the ends fastened by pinning them or in any ordinary way the several convolutions are separated by forming a cut at D. This cut extends through all convolutions and may be in the position of one of the elements on the cylinder, as indicated, or it may extend along the cylinder in any other direction. The several rings of wire are then removed and their ends electric welded together so as to constitute complete rings. These rings can be tempered or hardened if desired, something which has not been convenient heretofore on account of the fact that the wire had to be wound on the cylinder in its soft state. These rings are then placed on the cylinder B which they will fit tightly on account of having originally been wound on a slightly smaller one. It will be noticed that this cylinder has no means on its surface for holding them, consequently after the first ring is set up against an end ring B' the other ones are separated from each other by intermediate non-toothed rings E of wire which also are electric welded together at the ends and may be formed in the same way as the toothed rings so that they will be of the same inside diameter. These are built out to the end of the cylinder and then held by a ring F or in any other desired way so as to prevent their being dislodged from the cylinder. It will be seen, therefore, that the surface of the cylinder does not have to be machined except to true it up because the helicoidal groove is done away with. This itself reduces the expense. In addition to this the several rings are all independent of each other so that if an accident happens to one it will not destroy the usefulness of the whole set of teeth on the cylinder, as was the case with the common construction. In addition to this, as has been stated, the rings can be hardened or tempered if desired and thus made much more durable and their utility thus increased in this way.

Although I have illustrated and described a particular order of steps and a specific article manufactured, I am aware that many modifications can be made in both within the limits of the claims as herewith presented.

Having described my invention, what I claim is:—

1. The method of making wire covered toothed cylinders which consists in preparing a length of flat wire with teeth along one edge thereof, forming this wire into equal lengths, electric welding the ends of each of the lengths together to form rings, and fixing said rings on the surface of the cylinder.

2. The method of making wire covered toothed cylinders which consists in preparing a long length of flat wire having teeth along one edge thereof, winding said length of wire on a cylinder, cutting the convolutions of wire along a single line at the surface of said cylinder to form a plurality of rings, electric welding the ends of said rings to complete them, and applying them to the surface of another cylinder.

3. The method of making wire covered toothed cylinders which consists in preparing a long length of flat wire having teeth along one edge thereof, winding said length of wire on a cylinder, cutting the convolutions of wire along a single line at the surface of said cylinder to form a plurality of rings, electric welding the ends of said rings to complete them, applying them to the surface of another cylinder having a slightly larger diameter than the cylinder on which they were wound, placing between each two rings a ring of the same inside diameter and without teeth, and providing means for preventing the end rings from sliding on the cylinder.

In testimony whereof I have hereunto set my hand, in the presence of two subscribing witnesses.

ALLAN C. SARGENT.

Witnesses:
FRED W. SWAIN,
FRANK COLLINS.

---

Copies of this patent may be obtained for five cents each, by addressing the "Commissioner of Patents, Washington, D. C."